(12) United States Patent
Foged et al.

(10) Patent No.: US 11,019,177 B2
(45) Date of Patent: May 25, 2021

(54) SELECTING ASSETS

(71) Applicant: Facebook, Inc., Menlo Park, CA (US)

(72) Inventors: Leif Erik Foged, Seattle, WA (US); Shaun Patric Allison, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 673 days.

(21) Appl. No.: 15/215,922

(22) Filed: Jul. 21, 2016

(65) Prior Publication Data
US 2018/0027092 A1    Jan. 25, 2018

(51) Int. Cl.
| G06N 20/00 | (2019.01) |
| G06N 5/02 | (2006.01) |
| G06N 3/04 | (2006.01) |
| G06N 3/08 | (2006.01) |
| H04L 29/08 | (2006.01) |

(52) U.S. Cl.
CPC ......... *H04L 67/327* (2013.01); *G06N 3/0427* (2013.01); *G06N 3/08* (2013.01); *G06N 5/022* (2013.01); *G06N 20/00* (2019.01); *H04L 67/22* (2013.01); *H04L 67/306* (2013.01)

(58) Field of Classification Search
CPC ...... G06N 7/005; G06N 99/005; H04L 67/02; H04L 67/20; H04L 67/22; H04L 67/303; H04L 67/306; H04L 67/327; H04L 67/42; H04W 4/80; H04W 84/12
See application file for complete search history.

(56) References Cited

U.S. PATENT DOCUMENTS

| 6,347,313 B1 * | 2/2002 | Ma ...................... G06K 9/6253 707/711 |
| 8,402,094 B2 * | 3/2013 | Bosworth .............. G06Q 30/08 705/319 |
| 10,148,608 B2 * | 12/2018 | Chatterjee ............... H04L 51/32 |
| 10,157,224 B2 * | 12/2018 | Kazi ................. G06F 17/30705 |
| 2011/0029388 A1 * | 2/2011 | Kendall ................ G06Q 30/02 705/14.66 |
| 2011/0264519 A1 * | 10/2011 | Chan ..................... G06Q 30/02 705/14.49 |
| 2012/0166433 A1 * | 6/2012 | Tseng ..................... H04W 4/21 707/728 |
| 2012/0166532 A1 * | 6/2012 | Juan ................... G06Q 30/0224 709/204 |
| 2012/0221581 A1 * | 8/2012 | Narayanan .......... G06F 3/04842 707/748 |
| 2012/0226564 A1 * | 9/2012 | Mirrokni Banadaki ..................... G06Q 30/0254 705/14.66 |

(Continued)

*Primary Examiner* — Li B. Zhen
*Assistant Examiner* — Selene A. Haedi
(74) *Attorney, Agent, or Firm* — Baker Botts L.L.P.

(57) ABSTRACT

In one embodiments, one or more computer systems receive, from a client device of a user, a request to access content. The computer systems access a plurality of assets representing the content. The computer devices calculate, for each asset, using a deep-learning model, a probability of an interaction by the user upon providing the asset to the user, wherein the deep-learning model is based at least in part on one or more features associated with the user, the asset, or the content. The computer devices selects one of the assets based on the probability. The computer devices send, to the client device, the selected asset.

19 Claims, 5 Drawing Sheets

(56) References Cited

U.S. PATENT DOCUMENTS

| | | | | |
|---|---|---|---|---|
| 2013/0041653 A1* | 2/2013 | Tseng | .................... | G06Q 50/01 |
| | | | | 704/9 |
| 2013/0198008 A1* | 8/2013 | Kendall | ................ | G06Q 30/02 |
| | | | | 705/14.66 |
| 2013/0211925 A1* | 8/2013 | Holland | ............. | G06Q 30/0241 |
| | | | | 705/14.72 |
| 2014/0095606 A1* | 4/2014 | Matus | .................... | H04L 67/22 |
| | | | | 709/204 |
| 2014/0214964 A1* | 7/2014 | Liyanage | ................ | H04L 51/32 |
| | | | | 709/205 |
| 2017/0124200 A1* | 5/2017 | Zhong | ................ | G06F 16/9535 |
| 2017/0132510 A1* | 5/2017 | Paluri | ...................... | G06N 3/08 |
| 2017/0140285 A1* | 5/2017 | Dotan-Cohen | ........ | G06Q 10/04 |
| 2017/0193390 A1* | 7/2017 | Weston | ................ | G06Q 50/01 |

\* cited by examiner

SELECTING ASSETS

TECHNICAL FIELD

This disclosure generally relates to selecting assets to send to a user.

BACKGROUND

Assets may be associated with content accessed by a client device. Assets may include images, sound, video, or any other type of asset. Some users may respond in response to being provided assets. Responses may include clicking, downloading content, or any other suitable response. Different users may have different responses depending on the asset provide to the user.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH® communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may receive assets associated with content. The social-networking system may receive a request by a client device to access content. The social-networking system may access a deep-learning model (e.g., a machine learning model, a neural network, etc.) to determine a feature vector representation of each asset. The deep-learning model may use features associated with the asset, the content, and the user, along with the feature vectors, to calculate a probability of a user interaction (e.g., installing a game, dismissal, non-interaction, etc.) upon being provided the asset. An asset may be selected based on the probability and the selected asset may be sent to the user device.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
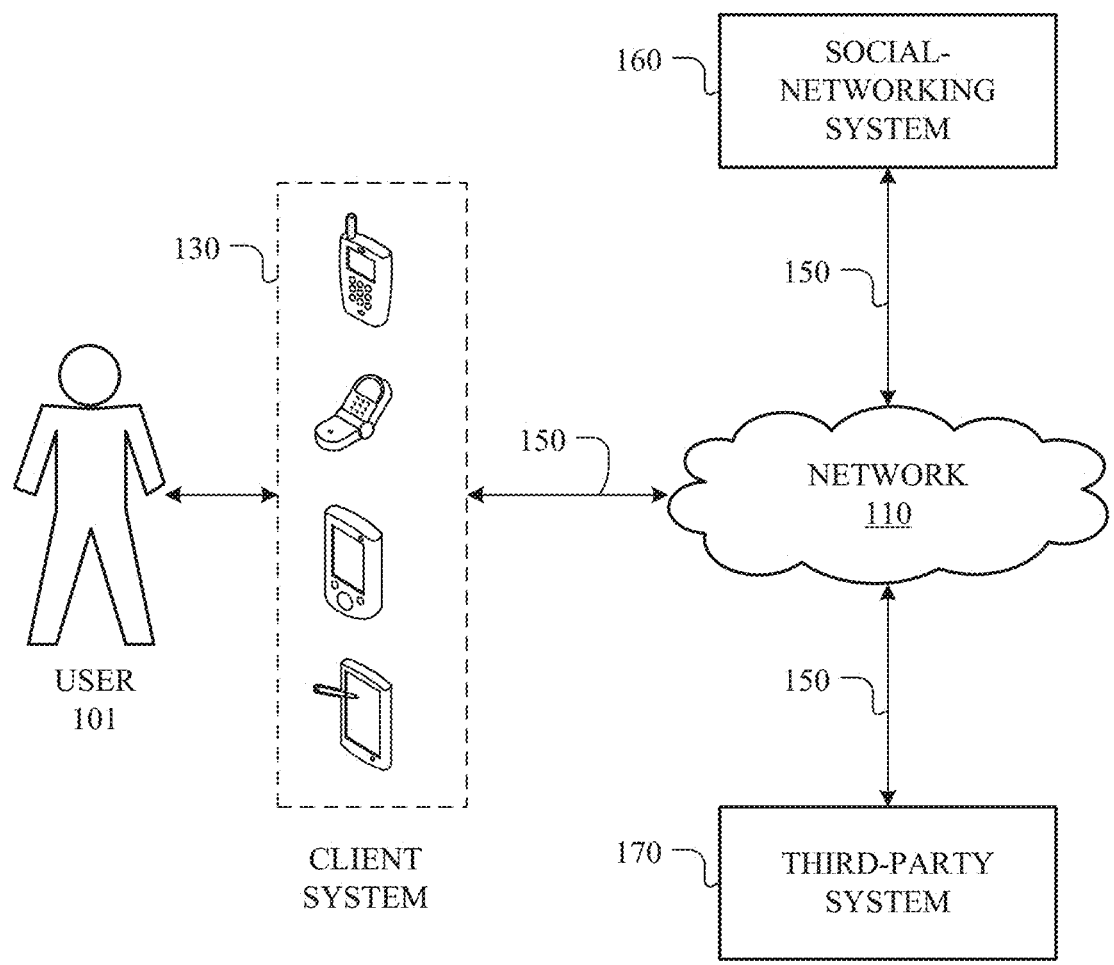
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example WI-FI® or Worldwide Interoperability for Microwave Access (WIMAX®)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
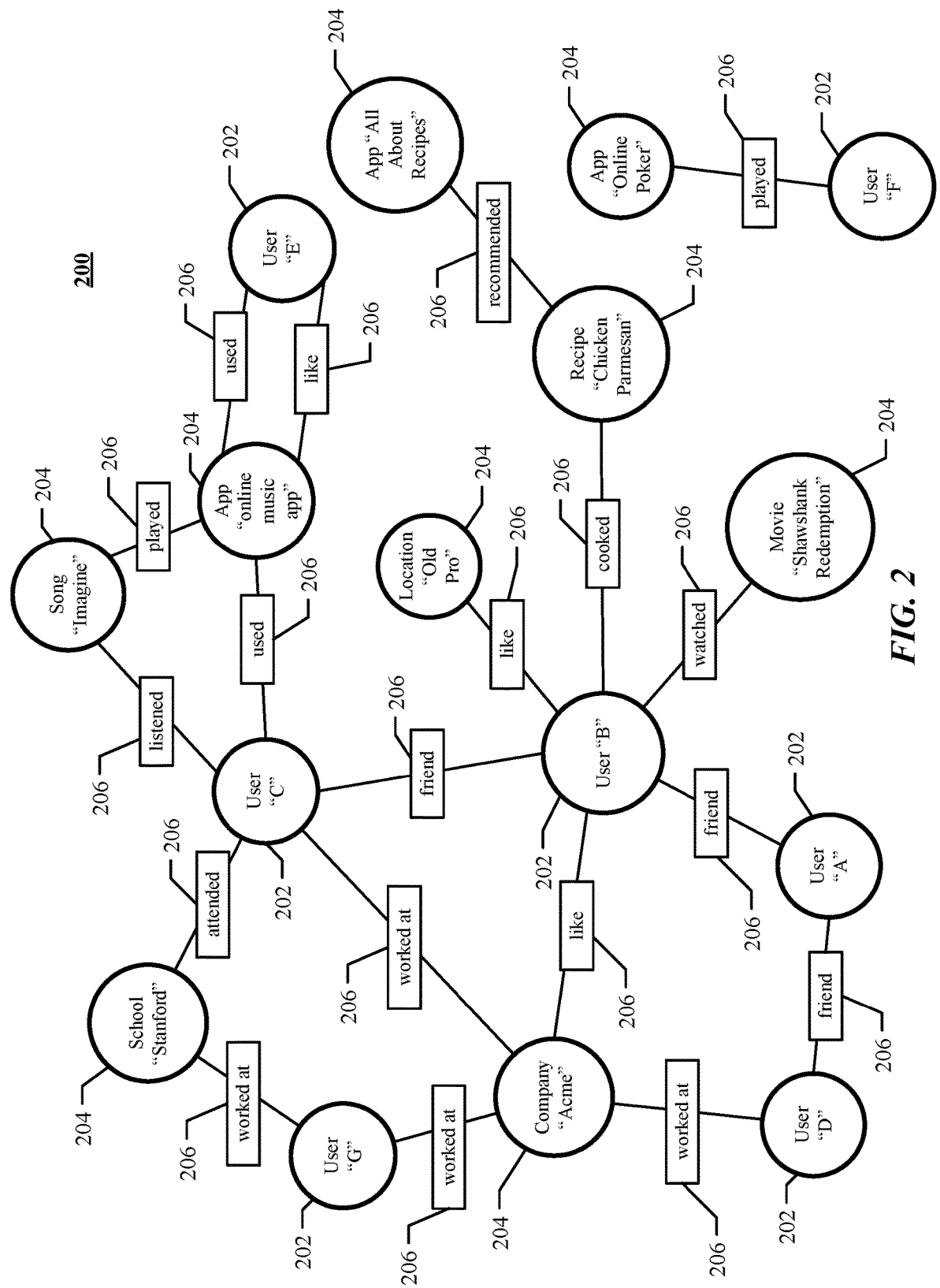
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (third-party online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (third-party online music application) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "online music application").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 160 may send a request to the data store for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
FIG. 3 illustrates an example of image assets.
Figure 3:
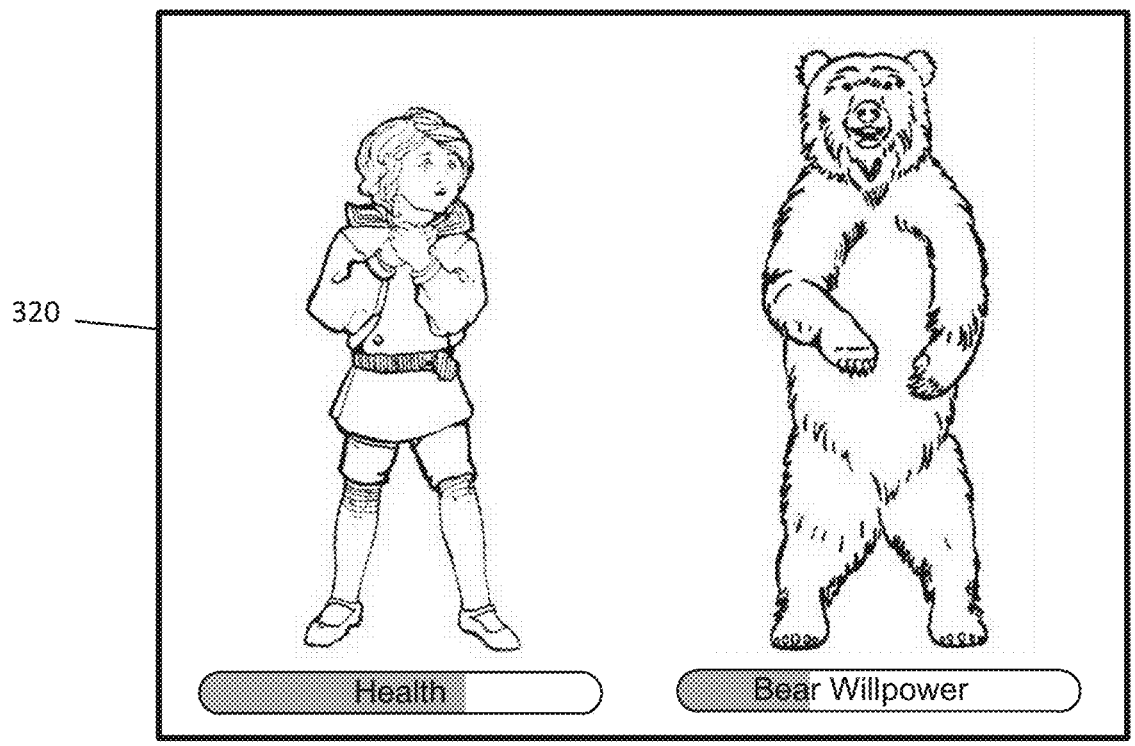
Figure 3:
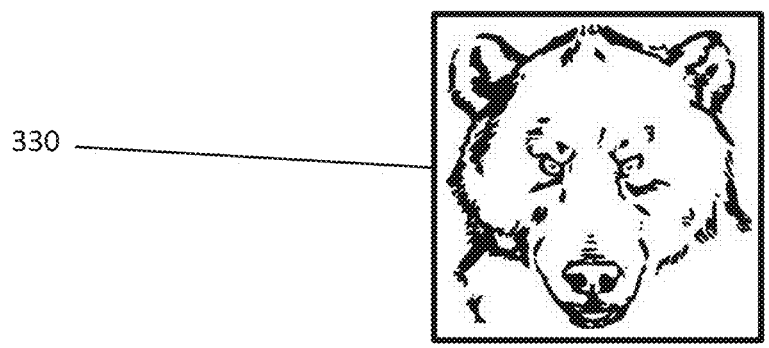

FIG. 3 illustrates an example collection of image assets. In particular embodiments, assets may be image assets. For example, assets may be images that relate to a game, such as the game "Bear Trainer." In some embodiments, an image asset may be a banner, such as image asset 310, a screenshot (e.g., a screenshot of gameplay for an image asset associated with a game), such as image asset 320, an icon, such as image asset 330, or any other suitable type of image asset. Different types of image assets may be identified by metadata. For example, image asset 310 may have metadata associated with it that identifies image asset 310 as a banner-type image asset. An image may be a single still image, a video, or an animation.

Although FIG. 3 illustrates particular assets with particular asset types, this disclosure contemplates any suitable asset of any suitable asset type. For example, an asset may be a sound asset (e.g., a sound in a file format such as mp3, way, etc.), a text asset, a video asset, any other suitable asset type, or any suitable combination of asset types (e.g., an asset that contains both an image asset and a text asset). As another example, a sound asset may have an asset type of voice, music, sound effect, or any other suitable asset type.

Figure 4:
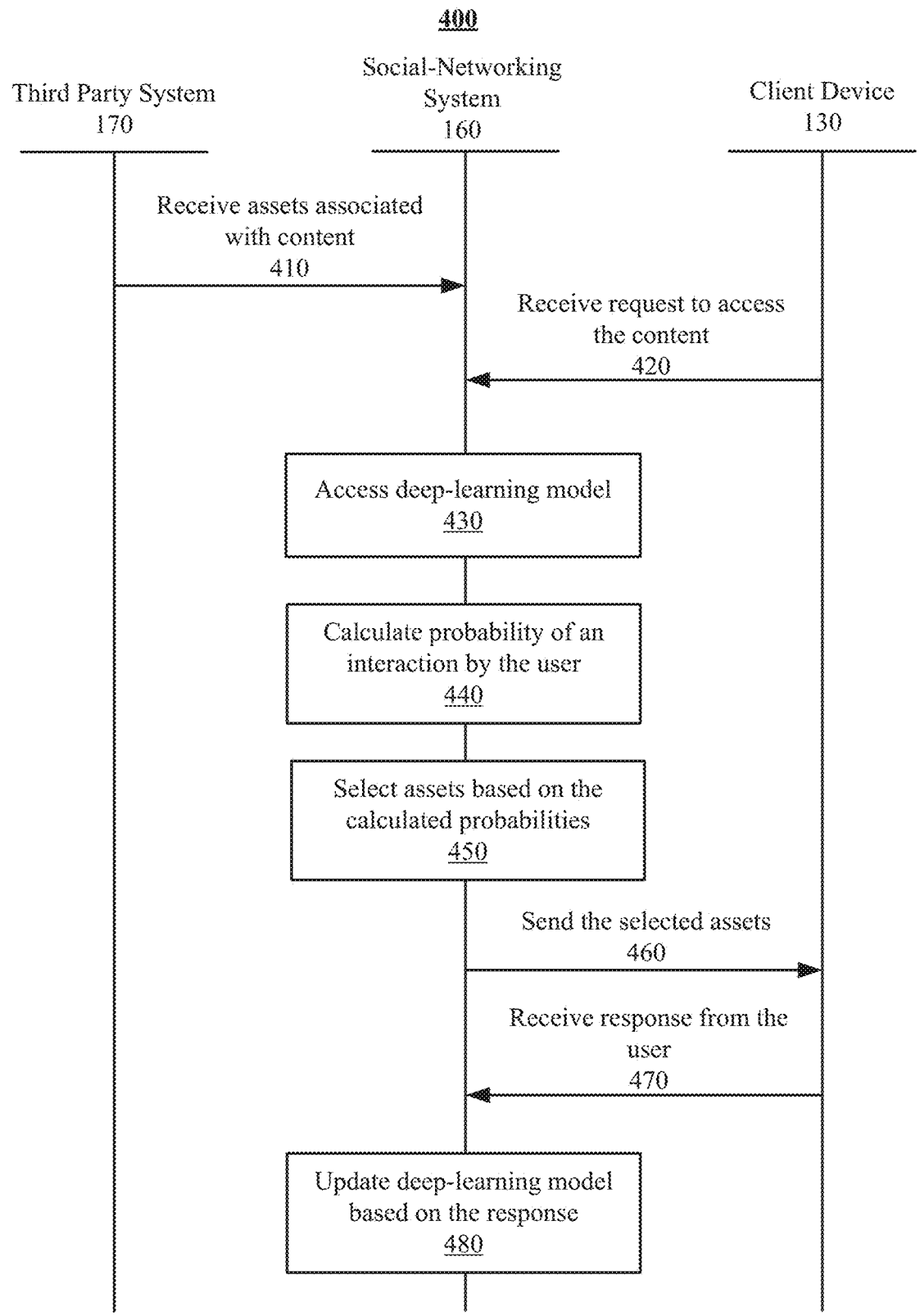
FIG. 4 illustrates an example method for selecting an asset.

FIG. 4 illustrates an example method 400 for selecting an asset. At step 410, social-networking system 160 may receive assets associated with content from third party 170. For example, third party system 170 may be a server associated with a game developer, game publisher, or game distributer, wherein third-party system 170 is hosting the source copies of the assets, the content may be a game titled "Bear Trainer", and the assets may be image assets associated with the content. In this example, social-networking system 160 may receive a number of different types of image assets, such as banners, screenshots of game play, logos, or any other suitable type of image asset. In some embodiments, social-networking system 160 may itself supply assets associated with the content. Although this disclosure may describe particular assets or particular content, this disclosure contemplates any suitable content and any suitable asset.

At step 420, client device 130 may send and social-networking system 160 may receive a request to access the content. In particular embodiments, a user may explicitly request content via client device 130. For example, a user may input a URL that directs a browser to a website with the content. In this example, the user may request access to a website related to the content. Additionally or alternatively, software on client device 130 may request content without needed explicit user input. For example, a software application on client device 130 may request a notification that includes the content. In particular embodiments, the content may be a game. For example, the request may be for a notification associated with the content. In this example, the content may be software that may be installed and played on a client device. In some embodiments, content may have one or more associated genres.

At step 430, social-networking system 160 may access a deep-learning model. The deep-learning model may be a machine-learning model, a neural network, a latent neural network, any other suitable deep-learning model, or any combination thereof. In particular embodiments, social-networking system 160 may utilize a deep-learning model as disclosed in U.S. patent application Ser. No. 14/981,413, entitled "Identifying Content Items Using a Deep-Learning Model" and filed 28 Dec. 2015, which is incorporated herein by reference as an example and not by way of limitation. The assets received in step 410 may be input into the deep-learning model. Any suitable number of assets may be input into a deep-learning model.

In particular embodiments, the deep-learning model (e.g., a neural network) may include one or more indices that map assets to feature vectors in $\mathbb{R}^d$, where $\mathbb{R}$ denotes the set of real numbers, and d is a hyper-parameter that controls capacity. The feature vectors may be d-dimensional intensity vectors. As used herein, intensity values may be any suitable values.

In particular embodiments, the deep-learning model may be trained to generate optimal feature vector representations of the assets. The deep-learning model may include one or more indices, which may be dynamically updated as the deep-learning model is trained. The one or more indices may be generated during a training phase of the deep-learning model. The deep-learning model may be, for example, a neural network or a latent neural network. The deep-learning model may be initialized using a random distribution. That is, the deep-learning model may initially have randomly-assigned mappings (i.e., between assets and feature vector representations). As an example and not by way of limitation, the random distribution may be a Gaussian distribution. The training may result in the one or more indices of the deep-learning model generating more optimal mappings than the initial mappings.

At step 440, a deep-learning model may be used to calculate the probability of a particular user interaction upon being provided the asset. In particular embodiments, a deep-learning model may be trained to calculate a probability of an interaction by a user upon being provided an asset. The probability may be based on a feature vector representation of the asset. For example, a feature vector representation of an asset may include elements or points (e.g., the feature vector may include multiple components). The components may be weighted to calculate the probability based in part on the feature vector representation of the asset and features associated with the user, the asset, or the content.

In some embodiments, the probability of a particular user interaction may be the probability of a click-through. For example, the probability of a particular user interaction upon a user being provided asset 310 may be the probability that the user will click the "Play Now!" button. As another example, the probability of a particular user interaction upon a user being provided asset 320 may be the probability that the user installs the content. In some embodiments, the probability of a particular user interaction may be the probability of dismissal. For example, the probability of a particular user interaction upon a user being provided asset 330 in a notification may be the probability that the user will dismiss the notification. In some embodiments, the probability of a particular user interaction may be the probability of non-interaction. For example, the probability of a particular user interaction upon a user being provided an asset in a notification may be the probability that the user will not dismiss the notification, click on any part of the notification, install a game associated with the notification, or otherwise interact with the notification. In some embodiments, the probability of a particular user interaction may be the probability that the user will interact with the content for a particular duration of time. For example, the probability of a particular user interaction upon a user being provided asset 310 may be a probability that the user will interact with the content for at least 2 hours. As another example, the probability of a particular user interaction upon a user being provided an asset related to a video clip may be the probability that the user will watch the entire video clip.

In particular embodiments, social-networking system 160 may generate a feature vector based on one or more user-level features associated with the user. The user-level features may capture how the user interacts with the social-networking system, a particular asset, comparable assets, particular content (e.g., a particular application), or a category of content. These features may be extracted based on real-time as well as historical social-networking information associated with the user. The user-level features may comprise the user's frequency of interacting with applications associated with social-networking system 160. The determination of this frequency may be made globally considering all data available about the user. Alternatively, the data used may be limited to a particular timeframe or a particular category of content. As an example and not by of limitation, social-networking system 160 may determine a number of times that the user has interacted with any content associated with social-networking system 160 within a specified period and extract the value as a feature associated with the user. Additionally or alternatively, social-networking system 160 may determine a frequency at which the user has interacted with content belonging to the same category as the content the user has requested and extract the frequency as a feature associated with the user. The user's frequency of interacting with content (e.g., one or more applications) may be positively correlated with the user's likelihood of being interested in particular content. The user-level features may also include a time of the user's most recent interaction with content associated with social-networking system 160. This value may be determined for any content associated with social-networking system 160 or content belonging to a particular category. As an example and not by way of limitation, social-networking system 160 may determine the time when the user last played any game associated with social-networking system 160 and extract this time as a feature associated with the user. If the user has recently been active on social-networking system 160 by interacting with content, it may be the case that the user is probably interested in the particular requested content. The user-level features may further include one or more other suitable features extracted from social-networking information associated with the user.

In particular embodiments, social-networking system 160 may generate a feature vector based on one or more application-level features. The application-level features may describe a particular application's performance as compared with other applications associated with social-networking system 160. The application-level features for the content may include, for example, a number of daily active users ("DAU") of the application, a number of monthly active users ("MAU") of the application, a growth rate of the application's DAU, a growth rate of the application's MAU, a conversion rate associated with the application among users of social-networking system 160 fitting a particular demographic description, a language supported by the application, another suitable feature, or any combination thereof. The above features may be extracted from one or more event logs associated with the application. As an example and not by way of limitation, the application sending the notification may have a DAU of 10,000. A similar application may have a DAU of 1,000. Using features extracted based on the applications' corresponding DAU values, social-networking system 160 may calculate a higher click-through probability for a notification sent by the former application than a notification sent by the latter application. It may be the case that an application with a higher DAU is more popular on the online social network; a notification sent by the application is more likely to be clicked on. As another example and not by way of limitation, the DAU for the application sending the notification may increase at a rate of 5% per month. In contrast, the DAU for another application may decrease at a rate of 5% per month. Using features extracted based on the applications' corresponding DAU growth rates, social-networking system 160 may calculate a higher click-through probability for content that includes the former application than content that includes the latter application. As yet another example and not by way of limitation, social-networking system 160 may access demographical information associated with the user with proper permissions. It may identify a group of other users who belong to the same demographical group as the user and calculate a conversion rate of the application among the identified group of users. The conversion rate may correspond to a probability that a user having seen a particular asset associated with the application ends up installing the application. A feature extracted based on the conversion rate may be positively correlated with the click-through probability associated with the notification. As yet another example and not by way of limitation, social-networking system 160 may determine one or more languages supported by the application sending and extract such information as a feature. Social-networking system 160 may further determine one or more languages spoken by the user based on profile or other social-networking information associated with the user. Overlap between the languages supported and the languages spoken may positively affect the calculated click-through probability.

In particular embodiments, the probability of an interaction by a user upon being provided an asset may be based on features associated with the user. In some embodiments, features associated with the user may include user profile information. For example, a user may have user profile information that indicates that they "like" bears and have played a game about training dogs. In some embodiments, features associated with the user may include device profile information for the client device. For example, a client device profile may indicate the size of the screen of the client device, the operating system type or version, the battery level, or any other suitable client device information. In some embodiments, features associated with the user may include information about the user's past interactions with the assets associated with the content. For example, the user may have previously been sent a video asset depicting the content, and the user may have pressed a play button to play the video asset. Further, in this example, the user may have watched half of the video asset and then stopped the video. In some embodiments, features associated with the user may include information about the user's past interactions with comparable assets. Determining whether assets are comparable may including comparing the asset types, comparing metadata associated with the assets, comparing the feature vector representations of the assets, or any other suitable comparison. For example, a user may have interacted with an image asset from associated with related content, which may be comparable to an image asset associated with the content (e.g., both assets may depict gameplay, both assets may use a similar color palette, a particular value of the cosine similarity between the feature vector representations of the assets, etc.). In some embodiments, features associated with the user may include information about the user's past interactions with the content. For example, the user may have the content or have played the content for an amount of time. In some embodiments, features associated with the user may include information about the user's past interaction with comparable content. For example, the user may have interacted with similar content, read about similar content, or interacted with other comparable content. Although this disclosure describes particular features associated with the user, this disclosure contemplates any suitable feature associated with the user.

In particular embodiments, the probability of an interaction by a user upon being provided an asset may be based on features associated with the asset. In some embodiments, features associated with the asset may include historical performance of the asset. For example, asset 320, an image asset depicting the content, may have been provided to other users in the past. In this example, other users may have had particular interactions upon viewing asset 320 (e.g., clicking on asset 320, installing, playing, or purchasing the content, exiting from the application used to view asset 320, etc.). Performance of asset 320 may be based on prior user interactions with asset 320, demographic information associated with the prior users, context information for the user interactions, etc. For example, prior users who viewed asset 320, where the context of asset 320 was that it was prominently displayed in the upper part of the prior users' screens may have installed the content and a higher rate than users who viewed other image assets. Further, the prior users may tend to be females who live in Iowa between the ages of 25 and 40. In some embodiments, features associated with the asset may include image recognition data associated with the asset. Image recognition data may be obtained by appearance-based methods (e.g., edge matching, greyscale matching, gradient matching, histograms, etc.), feature-based methods (e.g. geometric hashing, pose clustering, etc.), or any other suitable method of image recognition. For example, image recognition data for asset 330 may indicate that asset 330 depicts the head of a bear. In some embodiments, features associated with the asset may include a presentation format of the asset (e.g., an asset type, dimensions of an image asset, etc.). For example, an image asset may have assets types such as icon, screenshot, banner, etc. As a further example, a presentation format of an asset may include where the asset of displayed, if the asset is an image asset, the volume the asset was played, if the asset is a sound asset, or any other suitable presentation format. Although this disclosure describes particular features associated with the asset, this disclosure contemplates any suitable feature associated with the asset.

In particular embodiments, the probability of an interaction by a user upon being provided an asset may be based on features associated with the content. In some embodiments, features associated with the content may include a type of the content (e.g., game, movie, music, etc.). For example, the content may have the content type of game. In some embodiments, features associated with the content may include information associated with the content (e.g., a genre, a functionality, a language, an identify of a creator, publisher, or distributer, a number of users that interact with the content per day, a growth rate of the number of users that interact with the content per day, an installation rate associated with the content, an installation-to-play time duration associated with the content, a repeat-play value associated with the content, etc.). For example, the content may be in the action/adventure genre, have an entertainment functionality, include the English or Russian languages, have an identified creator, publisher, and distributer, have 1.3 million users who interact with the content per day, have a growth rate of 1,500 users per day who interact with the content, an 87% install rate of users who install the content after viewing an asset associated with the content, an installation-to-play time of 3.4 minutes (e.g., the time it takes users on average to play the content after installing), and a repeat-play time of 2.3 hours (e.g., users may on average spend 2.3 hours between play sessions). Although this disclosure describes particular features associated with the content, this disclosure contemplates any suitable feature associated with the content.

At step 450, social-networking system 160 may select one or more assets to send based on the calculated probabilities. For example, social-networking system 160 may select assets with the highest probability of a user installing a game. As another example, social-networking system 160 may select assets with the lowest probability of non-interaction. In some embodiments, an image asset may be selected if is has a higher click-through probability relative to the average click-through probability of candidate image assets for a given location that the asset is to be displayed. For example, if an image asset has a click-through probability of 76%, and the average click-through probability for candidate image assets for a given location is 38%, then that image asset may be selected based on having a click-through probability higher than the average click-through probability for candidate image assets for a given location.

In particular embodiments, an asset may be selected that fits a specified presentation format. A presentation format include information about the location an image asset is to be displayed. For example, a presentation format may include the dimensions (e.g., height and width, aspect ration, etc.), a type of asset (e.g., banner asset, icon, screenshot, etc.), or any other suitable information. For example, a specified presentation format may include that the asset will be placed in a location at the top of a web page and that the asset type will be a banner asset. In this example, a banner image asset with appropriate dimensions may be selected. As another example, an image asset may be displayed at a location of a particular size. In this example, some assets may be of the size of the location, while other assets may be cropped, scaled, resized, or otherwise modified to fit at the location. An asset may be selected such that the image asset will be suitable for the size of the location (e.g., the asset is the same size as the location it is to be displayed, resizing will not significantly impact the image quality, etc.).

In particular embodiments, a selected asset may be determined in response to receiving a request to view content. Additionally or alternatively, assets may be selected based on a calculated probability of a particular user interaction prior to receiving a request to view content. For example, calculating the probability of a particular user interaction or selecting an asset may be done with respect to particular demographics and the results stored. In this example, when a user requests to view content, the stored results may be referenced. As another example, the user may have requested to view the content prior to a subsequent request, and probability of a particular user interaction or selecting an asset from the prior request may be used for the subsequent request. At step 460, social-networking system 160 sends and client device 130 receives the selected assets.

At step 470, client device 130 sends and social-networking system 160 receives a response from the user. In some embodiments, the response may indicate a particular user interaction. For example, a user may install a game associated with a selected asset, and this response may be sent to social-networking system 160. As another example, the user response may indicate that the user has not interacted with the content associated with the selected asset. At step 480, social-networking system 160 may update the deep-learning model based on the response received from client device 130. For example, based on the response, a deep learning model may be updated by altering the feature vector representations of assets, altering the weighting of elements of feature vectors to calculate a probability, or any other suitable update.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for selecting an asset using a deep-learning model including the particular steps of the method of FIG. 4, this disclosure contemplates any suitable method for selecting an asset using a deep-learning model including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
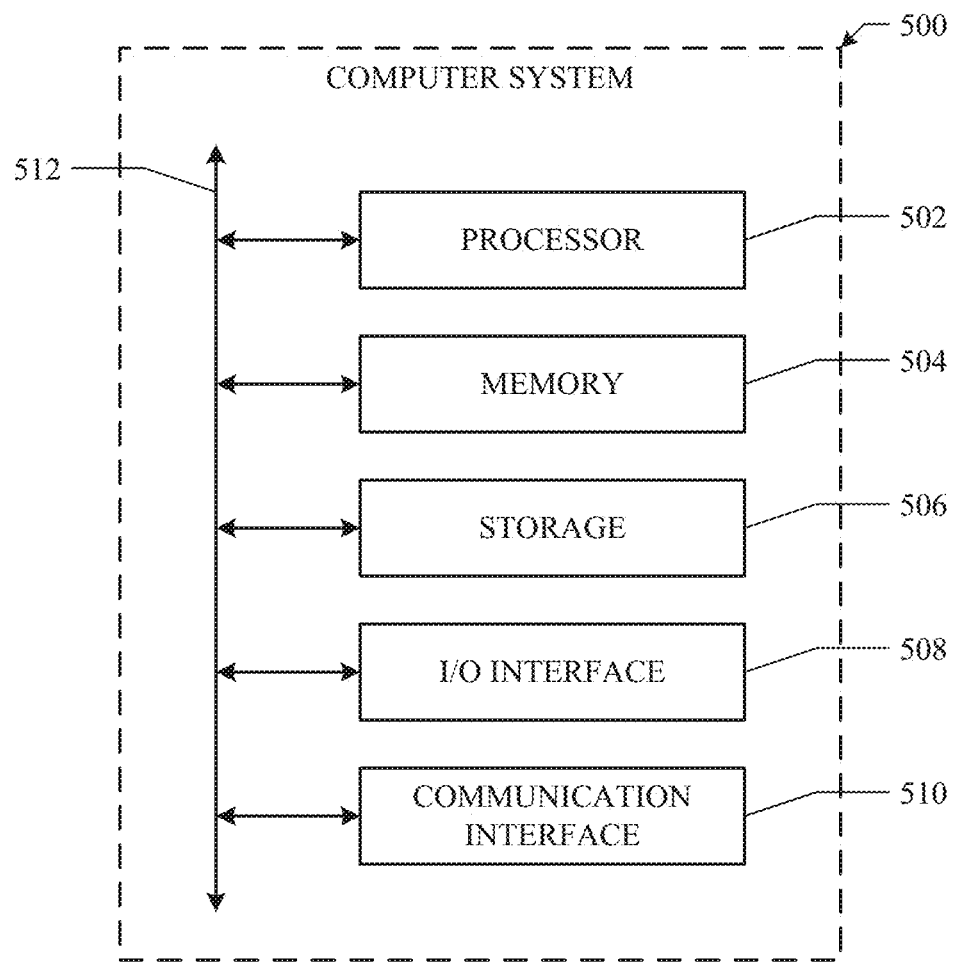
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI® network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH® WPAN), a WI-FI® network, a WIMAX® network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computer systems:
    receiving, from a client device of a user, a request to display information about applications executable by the client device of the user;
    for a first application executable by the client device of the user, selecting one or more assets representative of the first application by:
        accessing a plurality of assets associated with the first application, wherein the first application is one of a plurality of applications associated with a first category descriptive of the first application;
        determining a frequency at which the user has interacted with one or more other applications of the plurality of applications associated with the first category within a specified period of time;
        generating, for each asset, a feature vector representation of the asset using a machine-learning model that maps assets to an asset-feature embedding space, wherein the asset-feature embedding space comprises a plurality of clusters of feature vector representations, each cluster being associated with a class of assets, where distance within the asset-feature embedding space correlates to asset similarity;
        calculating, for each asset, a probability of the user interacting with the asset upon being provided the asset by applying an interaction prediction model to the feature vector representation of the asset, wherein the interaction prediction model comprises weights assigned to features associated with the user, the asset, and the first application, wherein calculating the probability comprises applying the weights to the feature vector representation of the asset,
            wherein the features associated with the user comprise the frequency at which the user has interacted with the one or more other applications of the plurality of applications associated with the first category within the specified period of time,
            wherein the features associated with the asset comprise a conversion rate for the asset and
            wherein the features associated with the first application comprise a historical rate of engagement of the first application indicative of at least a number of active users of the first application, and
        selecting one of the assets of the plurality of assets based on their respective probabilities; and
    sending the selected asset to the client device in response to the request to display the information about the applications executable by the client device of the user.

2. The method of claim 1, wherein the selected asset is an image asset.

3. The method of claim 2, wherein the selected asset is determined based on a specified presentation format for the selected asset on the client device, and wherein the specified presentation format comprises specified dimensions for the selected asset.

4. The method of claim 1, wherein the probability of the user interacting with the asset is calculated in response to receiving the request to display the information about the applications executable by the client device of the user.

5. The method of claim 1, wherein the features associated with the user comprise:
    user profile information associated with the user;
    device profile information associated with the client device;
    information about the user's past interactions with the assets;
    information about the user's past interactions with comparable assets;
    information about the user's past interactions with the first application;
    information about the user's past interactions with the plurality of applications associated with the first category; or information about the user's past interactions with comparable applications.

6. The method of claim 1, wherein the features associated with the asset comprise:
historical performance of the asset;
image recognition data associated with the asset; or
a type or presentation format of the asset.

7. The method of claim 6, wherein the historical performance of the asset is based on:
user interactions with one or more assets of the plurality of assets by a plurality of users;
demographic information associated with the plurality of users; or
context information for the user interactions with the one or more assets of the plurality of assets.

8. The method of claim 1, wherein the features associated with the first application comprise:
a type of the first application; or
information associated with the first application.

9. The method of claim 8, wherein the information associated with the first application comprises:
a genre;
a functionality;
a language;
an identity of a creator, publisher, or distributer of the first application;
a number of users who interact with the first application per day;
a growth rate of the number of users who interact with the first application per day;
an installation rate associated with the first application;
an installation-to-play time duration associated with the first application; or
a repeat-play value associated with the first application.

10. The method of claim 1, wherein the probability of the user interacting with the asset comprises a probability of a click-through, a probability of a dismissal, or a probability of non-interaction.

11. The method of claim 10, wherein the selected asset is determined based on the selected asset having the probability of the click-through that is greater than an average probability of the click-through for the plurality of assets.

12. The method of claim 1, wherein the first application is a game and wherein the calculated probability of the user interacting with the asset comprises a probability that the user will interact with the game for a particular duration of time.

13. The method of claim 1, wherein the application is a game and wherein the calculated probability of the user interacting with the asset comprises a probability that the user will install the game.

14. One or more computer-readable non-transitory storage media embodying software that is operable when executed to:
receive, from a client device of a user, a request to display information about applications executable by the client device of the user;
for a first application executable by the client device of the user, select one or more assets representative of the first application by:
accessing a plurality of assets associated with the first application, wherein the first application is one of a plurality of applications associated with a first category descriptive of the first application;
determining a frequency at which the user has interacted with one or more other applications of the plurality of applications associated with the first category within a specified period of time;
generating, for each asset, a feature vector representation of the asset using a machine-learning model that maps assets to an asset-feature embedding space, wherein the asset-feature embedding a space comprises a plurality of clusters of feature vector representations, each cluster being associated with a class of assets where distance within the asset-feature embedding space correlates to asset similarity;
calculating, for each asset, a probability of the user interacting with the asset upon being provided the asset by applying an interaction prediction model to the feature vector representation of the asset, wherein the interaction prediction model comprises weights assigned to features associated with the user, the asset, and the first application, wherein calculating the probability comprises applying the weights to the feature vector representation of the asset,
wherein the features associated with the user comprise the frequency at which the user has interacted with the one or more other applications of the plurality of applications associated with the first category within the specified period of time,
wherein the features associated with the asset comprise a conversion rate for the asset, and
wherein the features associated with the first application comprise a historical rate of engagement of the first application indicative of at least a number of active users of the first application, and
selecting one of the assets of the plurality of assets based on their respective probabilities; and
send the selected asset to the client device in response to the request to display the information about the applications executable by the client device of the user.

15. A system comprising: one or more processors; and a memory coupled to the processors comprising instructions executable by the processors, the processors being operable when executing the instructions to:
receive, from a client device of a user, a request to display information about applications executable by the client device of the user;
for a first application executable by the client device of the user, select one or more assets representative of the first application by:
accessing a plurality of assets associated with the first application, wherein the first application is one of a plurality of applications associated with a first category descriptive of the first application;
determining a frequency at which the user has interacted with one or more other applications of plurality of applications associated with the first category within a specified period of time;
generating, for each asset, a feature vector representation of the asset using a machine-learning model that maps assets to an asset-feature embedding space, wherein the asset-feature embedding space comprises a plurality of clusters of feature vector representations, each cluster being associated with a class of assets, where distance within the asset-feature embedding space correlates to asset similarity;
calculating, for each asset, a probability of the user interacting with the asset upon being provided the asset by applying an interaction prediction model to the feature vector representation of the asset, wherein the interaction prediction model comprises weights assigned to features associated with the user, the asset, and the first application, wherein calculating the probability comprises applying the weights to the feature vector representation of the asset, wherein the features associated with the user comprise the frequency at which the user has interacted with the one or more other applications of the plurality of applications associated with the first category within the specified period of time, wherein the features associated with the asset comprise a conversion rate for the asset, and wherein the features associated with the first application comprise a historical rate of engagement of the first application indicative of at least a number of active users of the first application, and selecting one of the assets of the plurality of assets based on their respective probabilities; and send the selected asset to the client device in response to the request to display the information about the applications executable by the client device of the user.

16. The method of claim 1, further comprising:
assigning the weights to the features associated with the user, the asset, and the first application based on one or more relationships to social-graph entities connected to the first application.

17. The method of claim 1, wherein the machine-learning model that maps the assets to the asset-feature embedding space generates the feature vector representation of the asset based on the features associated with the user, the asset, and the first application.

18. The method of claim 1, wherein the machine-learning model that maps the assets to the asset-feature embedding space is a deep-learning model trained to generate optimal feature vector representations of the assets.

19. The method of claim 1, wherein applying the weights to the feature vector representation of the asset comprises:
determining a subset of components of the feature vector representation relevant to each of the weights; and
combining the subset of components of the feature vector representation with the weights.

* * * * *